Aug. 15, 1933.  L. M. PERSONS  1,922,216
LAMINATED FIELD ASSEMBLY FOR ELECTRIC MOTORS
Filed June 28, 1930
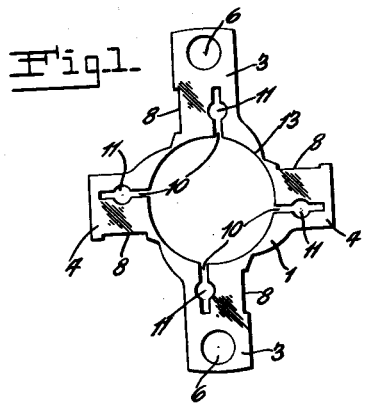
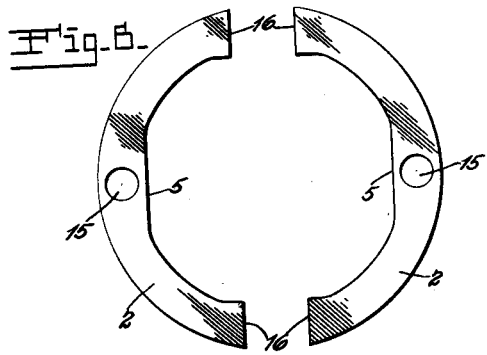
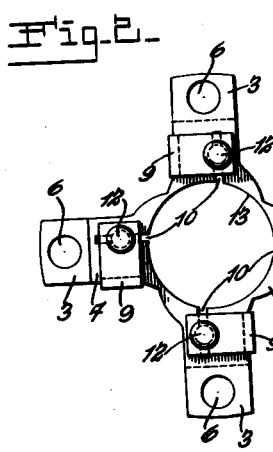
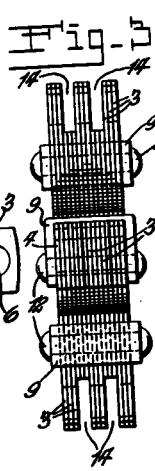
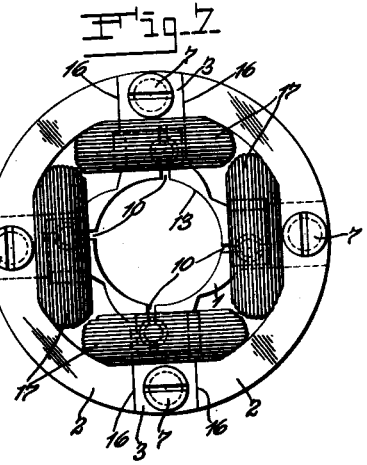
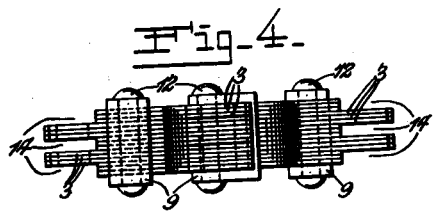
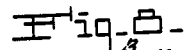
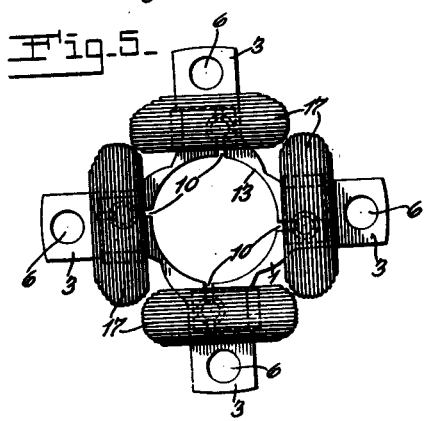
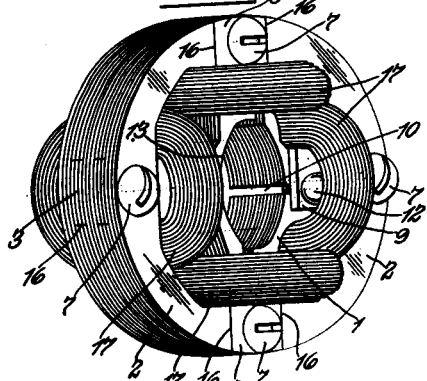
Inventor:
Lawrence M. Persons,
by Rippey & Kingsland.
His Attorneys.

Patented Aug. 15, 1933

1,922,216

UNITED STATES PATENT OFFICE 1,922,216

LAMINATED FIELD ASSEMBLY FOR ELECTRIC MOTORS

Lawrence M. Persons, St. Louis, Mo., assignor to The Emerson Electric Mfg. Co., St. Louis, Mo., a Corporation of Missouri Application June 28, 1930. Serial No. 464,490

5 Claims. (Cl. 172—36)

This invention relates to field structures for motors of the salient pole type.

One of the objects of this invention is to provide a field assembly for an electric motor which will result in a high weight efficiency, uniformity of torque, and improvement in static torque.

Another object is to provide a method of assembling a motor field structure that will make possible a greater latitude in the design of the pole piece; that will permit the design of a motor having a high weight efficiency; that will result in economies of manufacture; that will permit the design of a motor eliminating slots in the polar piece ordinarily required for the windings; that will permit the design of a motor having a uniformity of torque and an improved static torque; and that will permit the windings of coils on forms and the insertion of the completed coils over the pole pieces.

Other objects will be apparent from the following detail description taken in connection with the accompanying drawing, and which:—

Fig. 1 is a plan view of a central pole stamping.

Fig. 2 is a side elevation of a group of stampings arranged to form the central part of the field assembly Fig. 3 is a side elevation of the structure shown in Fig. 2.

Fig. 4 is a bottom or top view of the structure shown in Fig. 2.

Fig. 5 is a view similar to Fig. 2 in an advanced stage of assembly having the windings in place.

Fig. 6 is a plan view of the yoke punchings.

Fig. 7 is a side elevation of a completed structure.

Fig. 8 is an isometric projection of the completed assembly.

In this field assembly two forms of stamped laminations are used. One form, as shown in Fig. 1, is a center pole piece 1, and the other form as shown in Fig. 6, is a yoke piece 2. As illustrated and specifically described the embodiment is in a four pole motor, but it is obvious that the invention may be applied to motors of other types.

The pole piece stamping 1 has each alternate pole portion of different length, the longer portion 3 being adapted to extend to the outer periphery of the completed structure and the shorter portion 4 being adapted to meet an abutment 5 on the yoke piece 2. The portions 3 have a hole 6 to accommodate a bolt 7 or other type of clamping member. Each pole portion has a recess 8 to provide a seat for a shading copper 9. Each pole portion is also provided with a slot 10 for magnetic shading and a hole 11 for a copper rivet 12 which holds the shading copper 9 in position. The pole piece 1 is provided with a central bore 13, forming an unbroken polar face for the shading slots 10. Thus, there is entirely eliminated the break which ordinarily exists between the pole tips of the ordinary salient pole type punchings and which has heretofore been necessary for the insertion of the windings.

A group of the pole piece punchings 1 are assembled so that all of the punchings are not parallel but some of the punchings have the longer portions 3 registering with the shorter portions 4 of the other stampings; that is, in the embodiment shown, some of the punchings are rotated 90 geometric degrees from the others. This arrangement provides spaces 14 adapted to receive the central portions of the yoke stampings, as shown in Fig. 6, so that a hole 15 in the yoke stampings 2 will register with the hole 6 in the pole pieces, and ends 16 of the yoke stampings will abut the edges of the pole portions 3 of the pole pieces.

The U-shaped shading coppers 9 are placed about the pole piece in the recesses 8 and secured in position by copper rivets 12, which pass through the hole 11 in the laminations.

The coil 17 may be wound on a jig of such a form as to make the interior of the coil fit the pole pieces with a fair degree of accuracy. After the coil is wound it may readily be placed over the open ends of the pole pieces, as illustrated in Fig. 5. After this operation the yoke pieces 2 may be assembled with the structure as shown in Fig. 5, with their central portions fitting within the openings 14, the abutments 5 lying against the ends of the shorter pole portions 4, the ends 16 of the yoke pieces fitting against the edges of the longer pole portions 3, and the holes 15 registering with the holes 6 of the pole punchings. The bolts 7 may then be passed through the holes 6 and 15 and the entire structure clamped together.

The construction of the motor and the method by which it is assembled is such as to effect several distinct advantages. This invention makes possible the winding of the completed coil separately on a form or jig with no tedious effort on the part of the winder in order to place the various turns of the coil in a special small slot. It allows the use of a much smaller diameter coil since the coil may be wound to approximately fit the pole piece, thus resulting in the use of less copper but at the same time obtaining the same number of turns of a given size of wire. It further allows a more definite placement of the field insulations, not shown in the drawing. In fact, a taping of the field coil, an insulation which is unsurpassed in dielectric properties, may be used if it is so desired. Due to the fact that the coils are smaller in diameter a reduction in the size of the armature space is possible, thus permitting the use of a smaller armature.

Since the use of coils employing wire of a shorter length, but with the same number of turns, is possible, there is a reduction of resistance, resulting in greater coil and motor efficiency, and a reduction in power input as compared to the output of the motor.

In order to insure a uniformity of flux, producing a uniform starting and running torque, it is necessary to reduce to a minimum, or eliminate entirely, the break which exists between the pole tips of the standard salient type of motor. This break in the case of a standard structure is necessary in order to place the coils or windings about the pole pieces. By the structure of this invention, the break between the pole tips may be entirely eliminated.

The advantages in simplicity of stampings and assembling are obvious from the previous description and need not be further described.

Various changes may be made in the details of construction within the scope of the appended claims without departing from the spirit of this invention.

I claim:

1. In a motor field assembly of the salient pole type, a laminated magnetic structure including a series of stampings, each having a plurality of pole pieces joined at their inner ends by a web and open at their outer ends, and a second series of stampings forming continuous yokes connecting said pole pieces, each stamping in both series having a hole therethrough to receive a clamping member and so arranged that the clamping member engages through holes in some stampings only in a series and engages through holes in stampings of an adjacent series.

2. In a motor field assembly of the salient pole type, a laminated magnetic structure including a series of superimposed pole stampings, each having a plurality of pole pieces open at their outer ends and joined at their inner ends by a continuous web, a series of superimposed yoke stampings, some of said pole pieces abutting the continuous web, a series of superimposed yoke stampings, and clamping members each passing through some only of the pole stampings and some only of the yoke stampings.

3. In a motor field assembly of the salient pole type, a laminated magnetic structure including a series of superimposed pole stampings, each having a plurality of hole pieces open at their outer ends and joined at their inner ends by a continuous web, a series of superimposed yoke stampings, each alike in form and comprising less than one-half of the entire circumference of the structure, some of said pole pieces abutting the yoke stampings and others lapping the yoke stampings, and clamping members each passing through some only of the pole stampings and some only of the yoke stampings.

4. In a motor field assembly of the salient pole type, a laminated magnetic structure including a series of superimposed pole stampings, each being alike and having a plurality of pole pieces open at their outer ends and joined at their inner ends by a continuous web, with the pole pieces of uneven length, said pole stampings being stacked in such a manner that the tips of some of the pole pieces interlace with a series of superimposed yoke stampings and that the tips of other pole pieces abut said yoke stampings, and clamping members each passing through some only of the pole stampings and some only of the yoke stampings.

5. In a motor field assembly of the salient pole type, a laminated magnetic structure including a series of superimposed pole stampings, each alike, having a plurality of pole pieces open at their outer ends and joined at their inner ends by a continuous web and being radially assymmetrical, a series of superimposed yoke stampings, the said pole stamping being arranged in such a manner that the tips of some of said pole pieces lap the yoke stampings and the tips of other pole pieces abut the yoke stampings, and clamping members each passing through some only of the pole stampings and some only of the yoke stampings.

LAWRENCE M. PERSONS.